(12) United States Patent
Hamada et al.

(10) Patent No.: US 6,972,946 B2
(45) Date of Patent: Dec. 6, 2005

(54) ELECTRONIC APPARATUS HAVING A HOUSING

(75) Inventors: Tomohiro Hamada, Tokyo (JP); Atsushi Tatemichi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/821,059

(22) Filed: Apr. 8, 2004

(65) Prior Publication Data

US 2005/0041378 A1 Feb. 24, 2005

(30) Foreign Application Priority Data

Aug. 21, 2003 (JP) .......................... P2003-297705

(51) Int. Cl.[7] ................................................ G06F 1/16
(52) U.S. Cl. ..................................... 361/680; 361/724
(58) Field of Search ............................... 361/680, 725, 361/686; 312/223.2, 326–329; 292/116, 292/148, 156, 137, 302, 31, 120, 150

(56) References Cited

U.S. PATENT DOCUMENTS 5,808,861 A * 9/1998 Nakajima et al. ........... 361/680

| 6,125,040 A * | 9/2000 | Nobuchi et al. ............ 361/726 |
| 6,288,892 B1 * | 9/2001 | Lanz et al. ................. 361/683 |
| 6,394,300 B1 * | 5/2002 | Bosy .......................... 220/326 |
| 6,535,379 B1 | 3/2003 | Smeenge, Jr. et al. |
| 2003/0142472 A1 * | 7/2003 | Park ............................ 361/683 |

FOREIGN PATENT DOCUMENTS

| CN | 1213443 A | 4/1999 |
| CN | 2313240 Y | 4/1999 |
| CN | 1350217 A | 2/2002 |
| JP | 11-175186 | 7/1999 |
| JP | 2002-189530 | 7/2002 |
| WO | WO 97-34217 | 9/1997 |

* cited by examiner

Primary Examiner—Lynn Feild

Assistant Examiner—Zachary Pape (74) Attorney, Agent, or Firm—Blakely Sokoloff Taylor & Zafman (57) ABSTRACT

An electronic apparatus has a housing, a cover detachably supported on the housing, a lock mechanism which is covered with the cover and which locks the cover in the housing, and an operation portion which allows to access the lock mechanism from the outside of the housing and the cover, in order to unlock the cover from the housing.

20 Claims, 8 Drawing Sheets

ELECTRONIC APPARATUS HAVING A HOUSING

CROSS-REFERENCE TO RELATED APPLICATIONS

This application is based upon and claims the benefit of priority from Japanese Patent Application No. 2003-297705, filed Aug. 21, 2003, the entire contents of which are incorporated herein by reference.

BACKGROUND

1. Field

This invention relates to an electronic apparatus that has a component held in a housing that comprises two parts detachably engaged with each other.

2. Description of the Related Art

An electronic apparatus such as a portable computer comprises a keyboard arranged on the upper surface of a housing. The keyboard has a keyboard base and a plurality of key tops arranged on the upper surface of the keyboard base. The keyboard base is detachably supported on a keyboard support portion formed on the upper surface of the housing. The keyboard support portion is arranged in a recessed portion that is opened on the upper surface of the housing, and has a size corresponding to the keyboard base.

The front edge of the keyboard base is detachably coupled to the front edge of the keyboard support portion. The rear edge of the keyboard base is affixed to the bottom of the keyboard support portion through a screw, and held on the keyboard support portion through a keyboard holder made of a synthetic resin.

The keyboard holder is a long and narrow rod extending along the rear edge of the keyboard support portion and covers the rear edge of the keyboard base and a screw head. The keyboard holder has a plurality of engagement claws. The engagement claws are detachably fitted in the rear edge of the keyboard support portion. In this manner, the keyboard holder is held on the housing, and the rear edge of the keyboard base is caught between the keyboard holder and the bottom of the keyboard support portion.

Japanese Patent Application Publication (KOKAI) No. 11-175186 discloses a portable computer in which a keyboard unit is detachably mounted in a keyboard support portion by a keyboard holder. For detaching the keyboard unit, a user needs to remove the keyboard holder that has engagement claws engaged with the keyboard support portion. However, the engagement claws are strongly fitted in the keyboard support portion in order to suppress the instability of the keyboard holder. For this reason, in order to release the fitting state between the engagement claws and the keyboard support unit, the keyboard holder needs to be detached from the keyboard support portion with force stronger than the fitting force of the engagement claws, and the engagement claws needs to be forcibly deformed by a sharp-pointed tool such as a screwdriver is inserted in the engagement portion of the engagement claws.

As a result, there may be a fear of chipping or breaking the engagement claws, and the workability for detaching the keyboard holder is poor. Large amounts of labor and energy are required for the detaching operation.

BRIEF DESCRIPTION OF THE SEVERAL VIEWS OF THE DRAWINGS

The accompanying drawings, which are incorporated in and constitute a part of the specification, illustrate embodiments of the invention, and together with the detailed description of the embodiments given below, serve to explain the principles of the invention.

DETAILED DESCRIPTION

Various embodiments according to the invention will be described hereinafter with reference to the accompanying drawings. In general, according to one embodiment of the invention, an electronic apparatus comprises a housing, a cover detachably supported on the housing, a lock mechanism which is covered and which locks the cover in the housing, and an operation portion which allows access to the lock mechanism from outside of the housing and the cover, in order to unlock the cover from the housing. The electronic apparatus may be adapted as a portable computer, a personal digital assistant, or the like.

Figure 1:
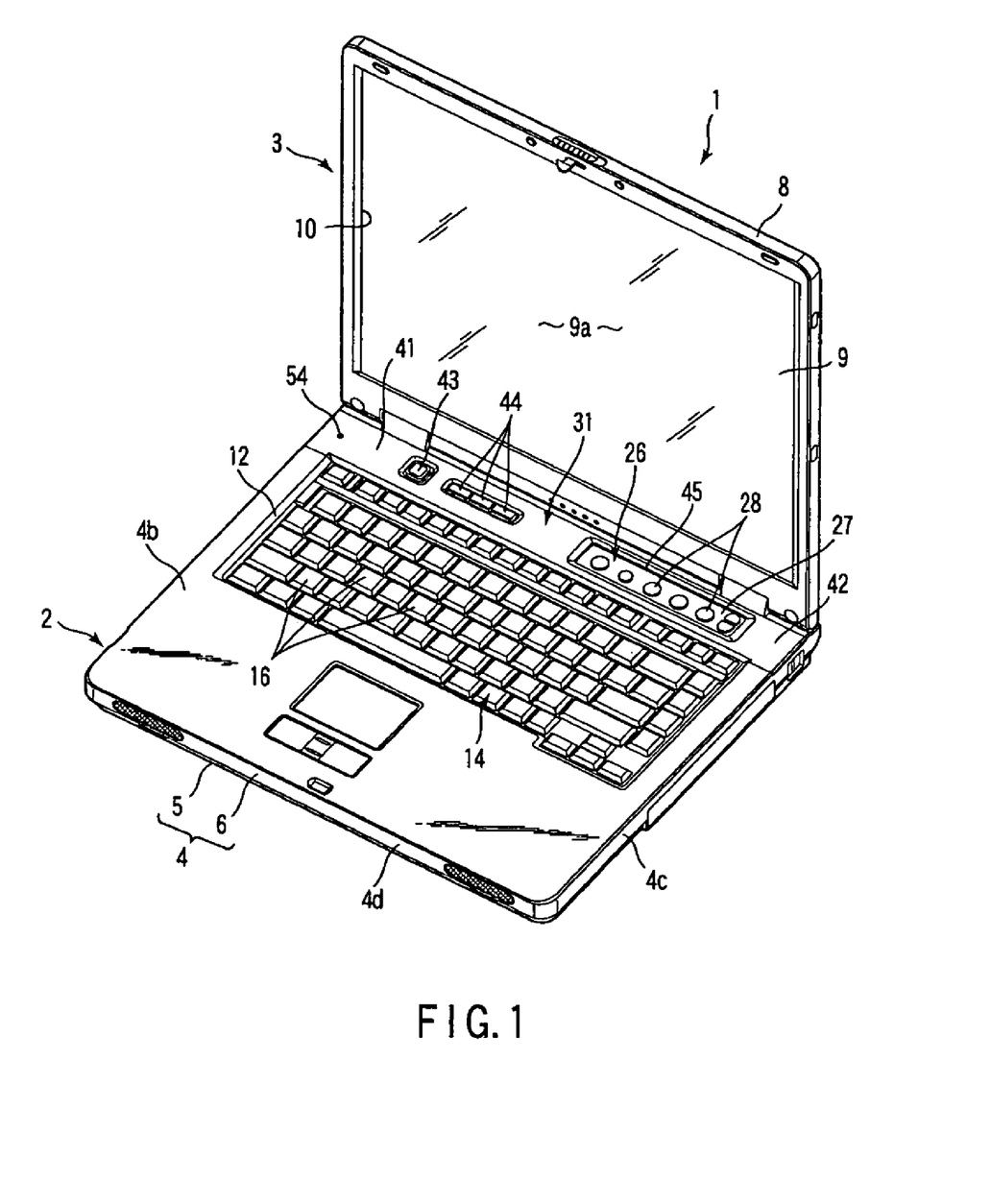
FIG. 1 is an exemplary perspective view of a portable computer according to a first embodiment of the present invention.
Figure 2:
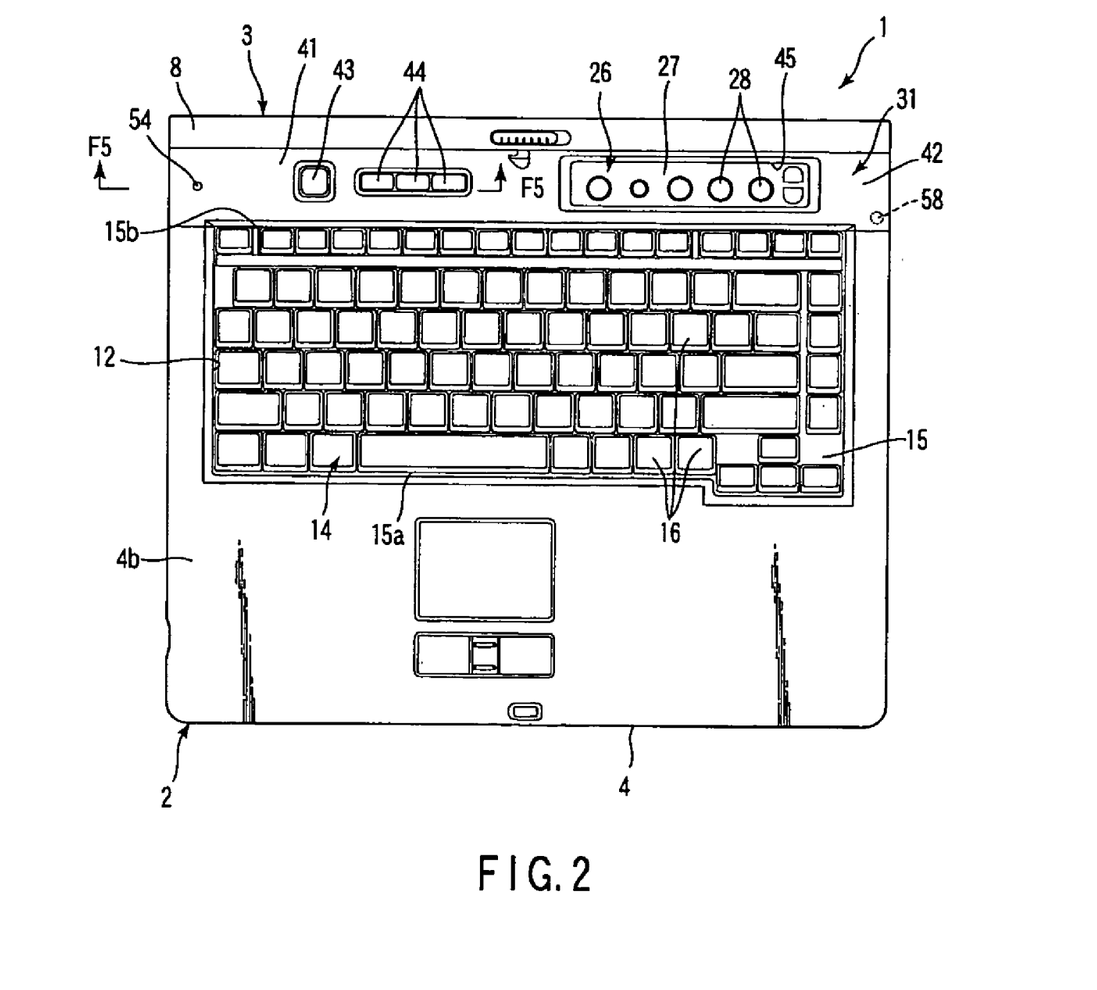
FIG. 2 is an exemplary plan view of the portable computer showing a state in which a display unit is pivoted at an open position in the first embodiment.

According to a first embodiment, FIGS. 1 and 2 disclose a portable computer 1 serving as an electronic apparatus. The portable computer 1 comprises a computer main body 2 and a display unit 3. The computer main body 2 has a housing 4 made of a synthetic resin. The housing 4 has a flat box-like shape having a bottom wall 4a, a top wall 4b, left and right side walls 4c, a front wall 4d, and a rear wall (not shown). The housing 4 is divided into a lower housing 5 including the bottom wall 4a and an upper housing 6 including the top wall 4b. The lower housing 5 and the upper housing 6 are connected to each other through a plurality of screws.

The display unit 3 comprises a display housing 8 and a liquid crystal display panel 9. The display housing 8 has a flat box-like shape. One end of the display housing 8 is pivotally connected to the rear end of the housing 4 through hinges (not shown). The liquid crystal display panel 9 is stored in the display housing 8. The liquid crystal display panel 9 has a screen 9a for displaying an image. The screen 9a is exposed to the outside of the display housing 8 through an opening 10 formed in the front surface of the display housing 8.

The display unit 3 may be pivoted between an open position and a close position. At the open position, the display unit 3 stands with respect to the housing 4 such that the top wall 4b of the housing 4 and the screen 9a are exposed. At the close position, the display unit 3 is laid down on the housing 4 such that the display unit 3 covers the top wall 4b of the housing 4.

Figure 3:
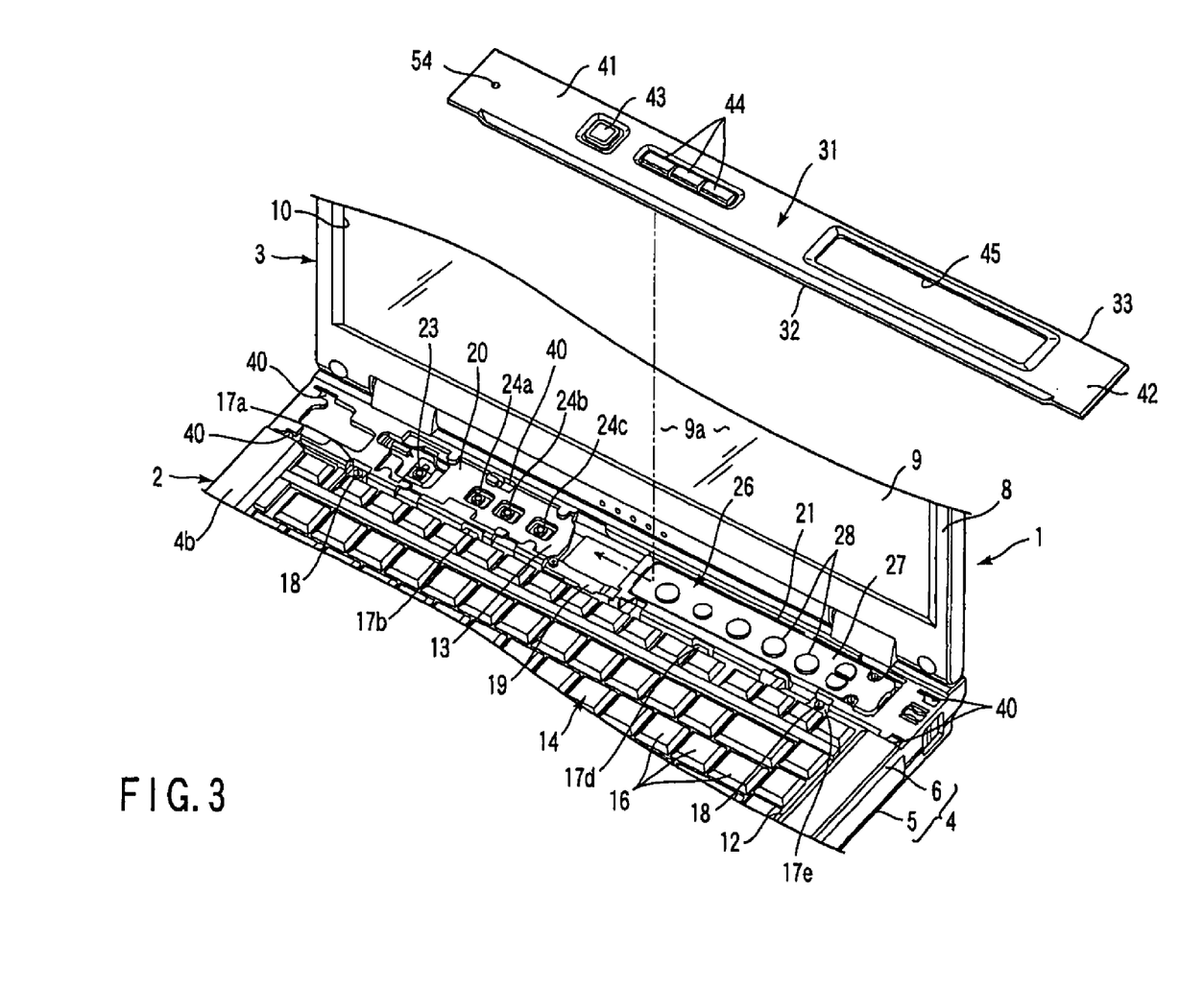
FIG. 3 is an exemplary perspective view of the portable computer showing a state in which a keyboard holder is detached from a housing to expose a user open area in the first embodiment.
Figure 4:
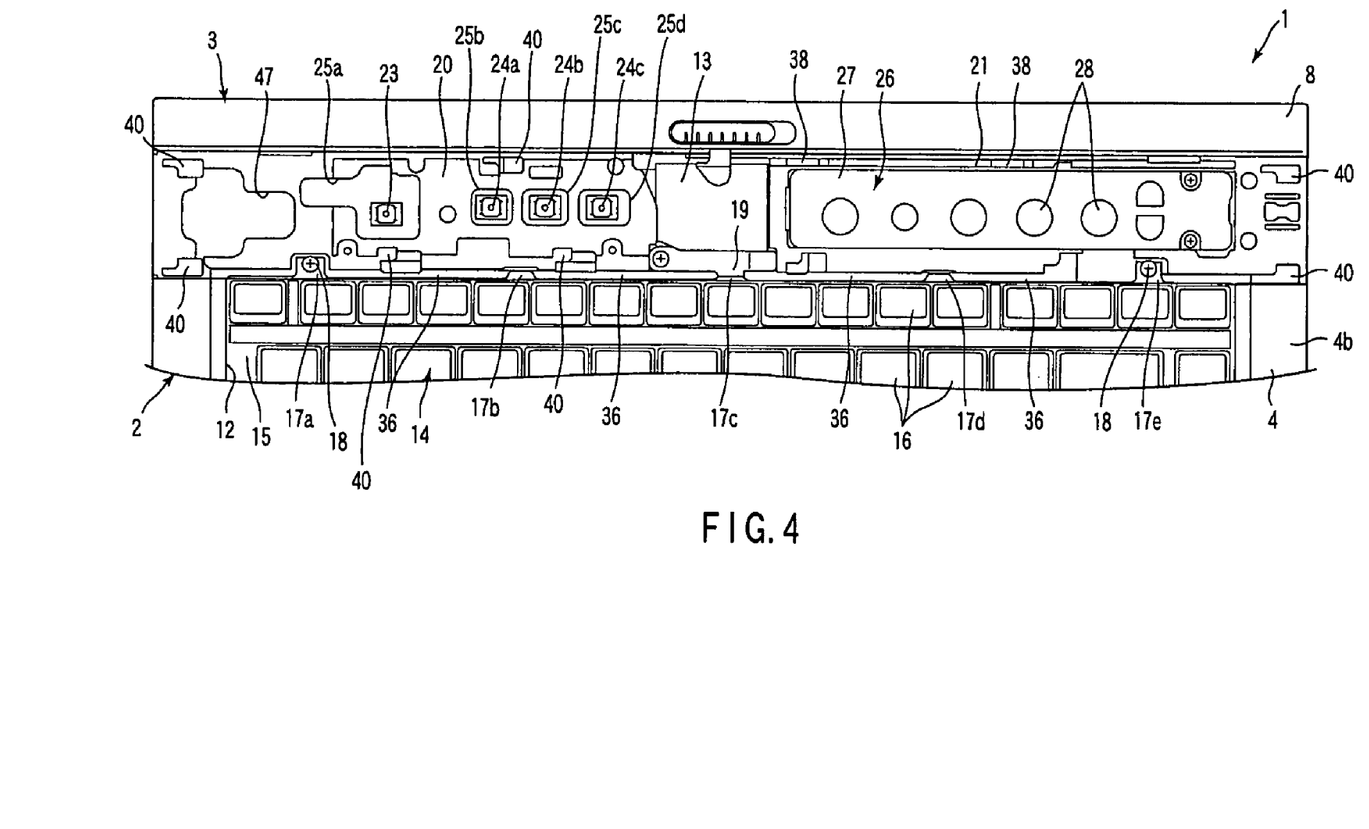
FIG. 4 is an exemplary plan view of the portable computer showing the state in which the keyboard holder is detached from the housing to expose a user operation area in the first embodiment.
Figure 7:
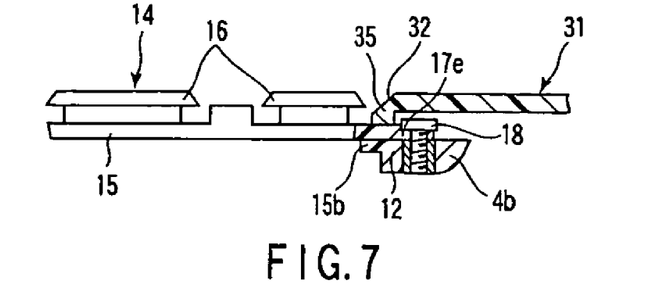
FIG. 7 is an exemplary sectional view of the portable computer showing a positional relationship between the keyboard holder and a keyboard in the first embodiment.

As shown in FIGS. 3 and 4, the top wall 4b of the housing 4 comprises a keyboard support portion 12 and a user open area 13. The keyboard support portion 12 is a rectangular recessed portion that is opened in the upper surface of the top wall 4b, and supports a keyboard 14. The keyboard 14 has a keyboard base 15 and a plurality of key tops 16 (see FIG. 7). The keyboard base 15 has a rectangular shape that is fitted in the keyboard support portion 12, and has a front edge 15a and a rear edge 15b that extend in the width direction of the housing 4. The key tops 16 are arranged on the upper surface of the keyboard base 15.

The front edge 15a of the keyboard base 15 is detachably coupled to the front edge of the keyboard support portion 12. As shown in FIG. 4, the rear edge 15b of the keyboard base 15 has first to fifth tongue portions 17a, 17b, 17c, 17d, and 17e. The tongue portions 17a, 17b, 17c, 17d, and 17e are situated backward facing, and are aligned at intervals in the longitudinal direction of the keyboard base 15.

The first and fifth tongue portions 17a and 17e are arranged at one end and the other end along the longitudinal direction of the keyboard base 15 and are fixed to the upper surface of the top wall 4b with screws 18. The second and third tongue portions 17c and 17d are located between the first and fifth tongue portions 17a and 17e, and are separated from each other in the longitudinal direction of the keyboard base 15. The third tongue portion 17c is located at an intermediate part of the keyboard base 15 along the longitudinal direction thereof. The third tongue portion 17c is held on the upper surface of the top wall 4b through a bracket 19 made of sheet metal. The bracket 19 is screwed on the top wall 4b of the housing 4.

As shown in FIGS. 3 and 4, the user open area 13 is a region that may be freely accessed by a user of the portable computer 1, and is located behind the keyboard 14. The user open area 13 is recessed to have a level lower than the upper surface of the top wall 4b of the housing 4 and extends in the width direction of the housing 4. One end of the user open area 13 is opened in a corner defined by the top wall 4b and the left side wall 4c of the housing 4. Similarly, the other end of the user open area 13 is opened in a corner defined by the top wall 4b and the right side wall 4c of the housing 4.

Figure 5:
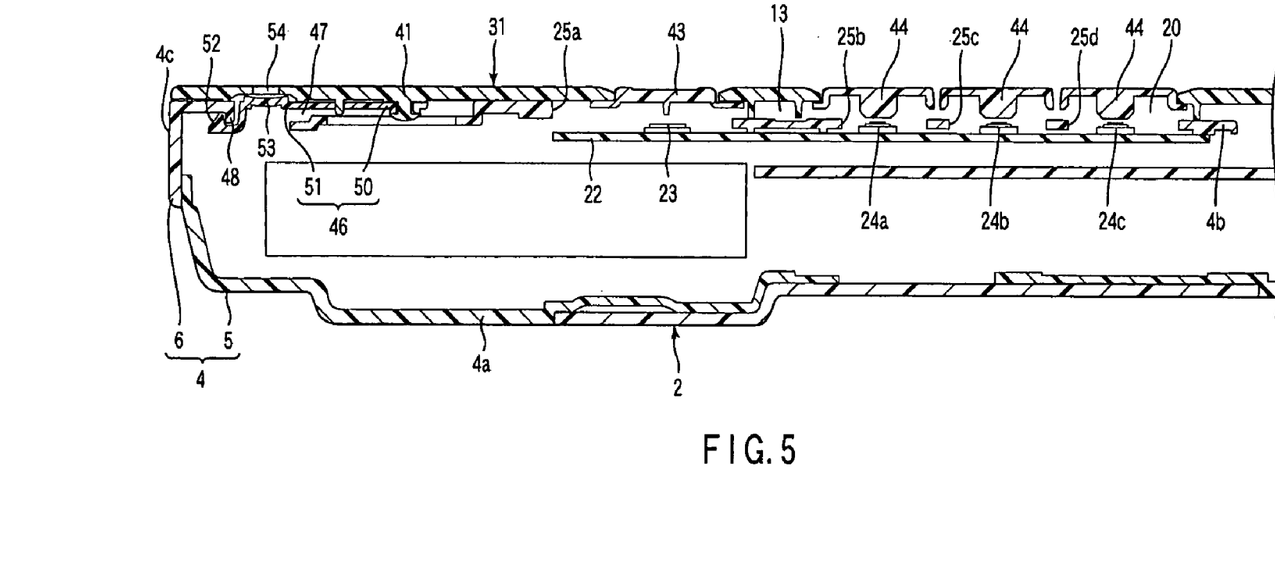
FIG. 5 is an exemplary sectional view taken along line F5—F5 of FIG. 2 in the first embodiment.

The user open area 13 has a switch setting portion 20 and a part storing portion 21. As shown in FIGS. 4 and 5, the switch setting portion 20 is located at the left half of the user open area 13, and covers a switch substrate 22 stored in the housing 4. A power supply switch 23 and a plurality of switches 24a, 24b, and 24c related to the Internet are mounted on the upper surface of the switch substrate 22. The switches 23, 24a, 24b, and 24c are aligned in the width direction of the housing 4. The switch setting portion 20 has four vent holes 25a, 25b, 25c, and 25d formed at positions corresponding to the switches 23, 24a, 24b, and 24c. For this reason, the switches 23, 24a, 24b, and 24c are exposed to the switch setting portion 20 of the user open area 13 through the four vent holes 25a, 25b, 25c, and 25d, respectively.

The part storing portion 21 is located at the right half of the user open area 13. The part storing portion 21 is to selectively hold a plurality of lifestyle units 26 (only one of them is illustrated) having different functions.

The lifestyle unit 26 serving as one example of functional parts comprises a long-and-narrow-plate-like main body 27. Operation buttons 28 related to a plurality of character inputs such as switching of English/Japanese, registration of word/term, and switching of input modes are arranged on the upper surface of the main body 27. As the other lifestyle units, for example, a lifestyle unit having a plurality of audio operation buttons such as a forward button, a backward button, and a play/pause button, a lifestyle unit having a photo frame in which a picture is pasted, and the like are prepared. The lifestyle unit 26 is fitted in the part storing portion 21 such that the operation buttons 28 face upward, and has one end which is screwed on the part storing portion 21.

As shown in FIGS. 3 and 5, the user open area 13 may be covered with a detachable keyboard holder 31 serving as a cover. The keyboard holder 31 is made of a synthetic resin, and has a long-and-narrow-plate-like shape extending in the width direction of the housing 4. The keyboard holder 31 has a front edge 32 facing the keyboard 14 and a rear edge 33 located on the opposite side of the front edge 32. The front edge 32 of the keyboard holder 31 covers the rear edge 15b of the keyboard base 15 of FIG. 2.

Figure 6:
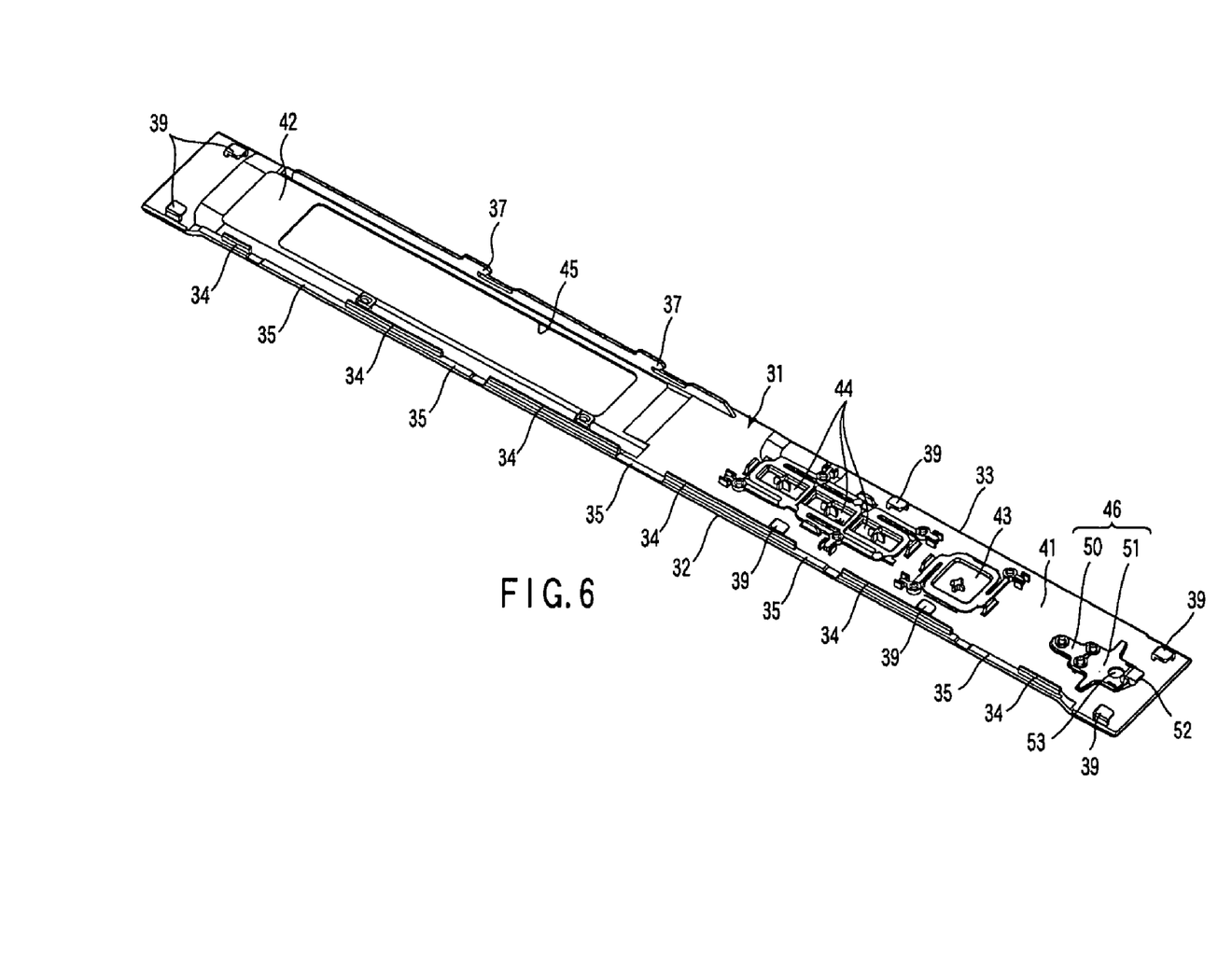
FIG. 6 is an exemplary perspective view of the keyboard holder used in the first embodiment.

As shown in FIGS. 4 and 6, a plurality of guide projections 34 projecting downward and a plurality of holding portions 35 are formed on the front edge 32 of the keyboard holder 31. The guide projections 34 are aligned at intervals in the longitudinal direction of the keyboard holder 31. These guide projections 34 correspond to a plurality of guide holes 36 formed in a boundary portion between the user open area 13 and the keyboard support portion 12 on the upper surface of the housing 4, and are fitted in the guide holes 36 such that the guide projections 34 can be slid in the width direction of the housing 4.

The holding portions 35 are located between adjacent guide projections 34. The holding portions 35 slightly extend from the lower surface of the keyboard holder 31, and are brought into contact with the tongue portions 17a, 17b, 17c, 17d, and 17e and the bracket 19.

A plurality of first engagement projections 37 projecting downward are formed on the rear edge 33 of the keyboard holder 31. The first engagement projections 37 are aligned at intervals in the longitudinal direction of the keyboard holder 31. The first engagement projections 37 correspond to a plurality of first engagement holes 38 opened in the rear end of the part storing portion 21 in the user open area 13, and are inserted into the first engagement holes 38 such that the first engagement projections 37 can be slid in the width direction of the housing 4.

Furthermore, as shown in FIG. 6, a plurality of second engagement projections 39 projecting downward are formed on the lower surface of the keyboard holder 31. The second engagement projections 39 are located near the four corners, the front edge 32, and the rear edge 33 of the keyboard holder 31. The second engagement projections 39 correspond to a plurality of second engagement holes 40 opened in the user open area 13, and are inserted into the second engagement holes 40 such that the second engagement projections 39 can be slid in the width direction of the housing 4.

In order to attach the keyboard holder 31 to the housing 4, the guide projections 34 and the first and second engagement projections 37 and 39 of the keyboard holder 31 are inserted into the guide holes 36, the first engagement holes 38, and the second engagement holes 40 of the user open area 13, respectively. In this manner, the lower surface of the keyboard holder 31 overlaps the upper surface of the user open area 13, and the holding portions 35 of the keyboard holder 31 are brought into contact with the bracket 19 and the tongue portions 17a, 17b, 17c, 17d, and 17e of the keyboard base 15.

The keyboard holder 31 is slid from the part storing portion 21 toward the switch setting portion 20. This sliding operation causes the first engagement projections 37 to hang on the first engagement holes 38 and the second engagement projections 39 to hang on the second engagement holes 40. As a result, the keyboard holder 31 is held at a predetermined position of the housing 4. The keyboard holder 31 covers the switch setting portion 20 and the part storing portion 21 on the user open area 13.

In addition, the bracket 19 is caught between one of the holding portions 35 of the keyboard holder 31 and the upper surface of the top wall 4b, and the tongue portions 17a, 17b, 17c, 17d, and 17e of the keyboard base 15 are caught between the other holding portions 35 of the keyboard holder 31 and the keyboard support portion 12. In this manner, the keyboard 14 is held by the keyboard support portion 12 through the keyboard holder 31.

For this reason, the keyboard holder 31 can be slid between a first position where the first and second engagement projections 37 and 39 are inserted into the first and second engagement holes 38 and 40, respectively, and a second position where the first and second engagement projections 37 and 39 are coupled to the first and second engagement holes 38 and 40 in the width direction of the housing 4.

As shown in FIG. 3, the keyboard holder 31 has a first cover part 41 covering the switch setting portion 20 and a second cover part 42 covering the part storing portion 21. The first cover part 41 has a power supply switch button 43 and a plurality of operation buttons 44. The power supply switch button 43 and the operation buttons 44 are supported by the first cover part 41 such that the power supply switch button 43 and the operation buttons 44 are vertically displaced, and face the power supply switch 23 and the switches 24a, 24b, and 24c, respectively.

The second cover part 42 has a slit-like opening 45. The opening 45 faces the lifestyle unit 26 and exposes the operation buttons 28 outside of the housing 4.

Figure 8:
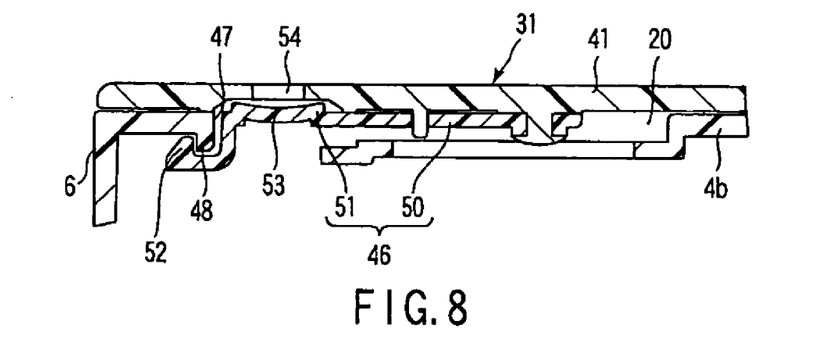
FIG. 8 is an exemplary sectional view showing a state in which a claw portion of a lock member is engaged with a convex portion of a housing in the first embodiment.

As shown in FIGS. 4, 6 and 8, a lock member 46 made of a synthetic resin is held on the lower surface of the keyboard holder 31. The lock member 46 is located at a distal end along a slide direction in which the keyboard holder 31 is slid from the second position to the first position. The lock member 46 is interposed between the keyboard holder 31 and the switch setting portion 20 of the user open area 13 when the user open area 13 is covered with the keyboard holder 31.

The switch setting portion 20 has an opening 47 formed at a position corresponding to the lock member 46 to avoid the switch setting portion 20 from interfering the lock member 46. The opening 47 is opened toward the inside of the housing 4. A convex portion 48 extending downward is formed on the opening edge of the opening 47. As the convex portion 48 is a portion that engages with the lock member 46, the convex portion 48 and the lock member 46 constitutes a locking mechanism for fixing the keyboard cover 31.

The lock member 46 has a fixed portion 50 and a movable portion 51. The fixed portion 50 is fixed to the lower surface of the keyboard holder 31 by a means such as thermal caulking or the like. The movable portion 51 has a claw portion 52 and a press portion 53. The claw portion 52 may be elastically displaced between an engagement position, and a disengagement position. In an engagement position, the claw portion 52 engages with the convex portion 48 when the keyboard holder 31 is slid to the second position. In the disengagement position, however, the claw portion 52 is disengaged from and below the convex portion 48, but may be urged to return to the engagement position by the specific elastic force of the movable portion 51.

For this reason, when the keyboard holder 31 is slid from the first position to the second position, the claw portion 52 of the lock member 46 runs on the convex portion 48 to engage with the convex portion 48. In this manner, the sliding of the keyboard holder 31 from the second position to the first position is blocked to hold the keyboard holder 31 at the second position.

The press portion 53 of the lock member 46 is located between the fixed portion 50 and the claw portion 52, and may be displaced together with the claw portion 52. The press portion 53 faces the lower surface of the keyboard holder 31. The keyboard holder 31 has a through hole 54 serving as an operation portion at a position corresponding to the press portion 53 of the lock member 46. The through hole 54 has a very small size such that the distal end of a pencil or pen 55 (see FIG. 9) can be inserted into the through hole 54, and a part of the upper surface of the press portion 53 faces the bottom of the through hole 55. For this reason, a part of the upper surface of the press portion 53 is exposed to the outside of the keyboard holder 31 through the through hole 54.

In other words, the press portion 53 of the lock member 46 is covered with the keyboard holder 31 except for a very small region facing the through hole 54. Thus, although the press portion 53 is exposed to the outside of the keyboard holder 31, it is difficult to directly operate the press portion 53 with the fingertips of a hand. This structure allows a user to avoid inadvertently unlocking the keyboard holder 31.

A procedure of detaching the keyboard holder 31 from the user open area 13 of the housing 4 in the portable computer 1 having the above configuration will be described below.

Figure 9:
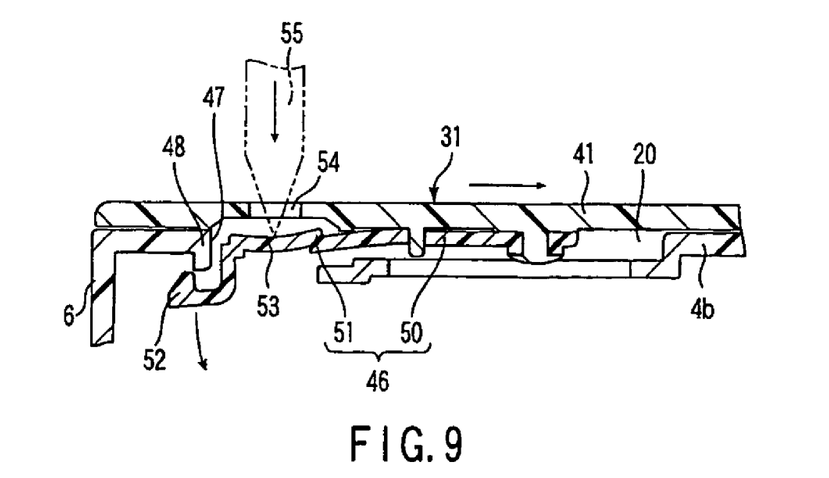
FIG. 9 is an exemplary sectional view showing a state in which an engagement between the claw portion of the lock member and the convex portion of the housing is released in the first embodiment.

As shown in FIG. 9, the distal end of the pencil or pen 55 is inserted into the through hole 54 of the keyboard holder 31 from the above, and the press portion 53 is forced downward with the distal end of the pencil or pen 55. The depressing operation displaces the claw portion 52 from the engagement position to the disengagement position against the specific elastic force of the movable portion 51 to separate the claw portion 52 from the convex portion 48. In this way, the lock state of the keyboard holder 31 set by the lock member 46 is released and the locking mechanism is unlocked.

Next, the keyboard holder 31 is slid from the second position to the first position to disengage the first and second engagement projections 37 and 39 and the first and second engagement holes 38 and 40. Thereafter, the keyboard holder 31 is pulled up from the user open area 13, and the first and second engagement projections 37 and 39 are pulled out of the first and second engagement holes 38 and 40, respectively. In this manner, detachment of the keyboard holder 31 is completed, and the user open area 13 is exposed to the outside of the housing 4.

According to the first embodiment of the present invention, with a simple operation in which the press portion 53 of the lock member 46 is pressed with the distal end of the pencil or pen 55 from the outside of the portable computer 1, the engagement between the claw portion 52 of the lock member 46 and the convex portion 48 of the housing 4 may be easily released. For this reason, when the keyboard holder 31 is detached from the housing 4, the detaching operation of the keyboard holder 31 may be smoothly and rapidly performed without any severe damages on the locking mechanism.

Furthermore, when the keyboard holder 31 is slid from the first position to the second position along the upper surface of the user open area 13, the claw portion 52 of the lock member 46 is automatically engaged with the convex portion 48 of the housing 4, and the keyboard holder 31 is locked at the second position. For example, when the portable computer 1 is carried, even if a fingertip of a hand is hanged on with the keyboard holder 31, the keyboard holder 31 is not unexpectedly slid from the second position to the first position, or the keyboard holder 31 is not detached from the housing 4. Therefore, the portable computer 1 may be easily handled in carrying.

The present invention is not limited to the first embodiment, and various changes and modifications may be performed.

For example, as indicated by a chain double-dashed line in FIG. 2, the keyboard holder 31 may be accessorily fixed to the housing 4 with a screw 58 at a position distant from the lock member 46. With this configuration, an engagement state between the claw portion 52 of the lock member 46 and the convex portion 48 of the housing 4 can be maintained by the screw 58. For this reason, a load applied to the claw portion 52 and the convex portion 48 can be reduced, and the keyboard holder 31 may be reliably locked at the second position.

In the above embodiment, the lock member 46 is independent of the keyboard holder 31. However, the lock member 46 may be integrally formed on the lower surface of the keyboard holder.

Furthermore, the cover according to the present invention is not limited to a cover having a function of holding the keyboard 14, and any cover member, which detachably covers at least the user open area 13 may be used.

In the first embodiment, the through hole 54 is formed in the keyboard holder 31 as the operation portion, and the press portion 53 is exposed. However, the press portion 53 is not necessarily exposed, there may be movable material in the through hole 54 so that the press portion 53 is depressed indirectly.

Furthermore, the location of the lock member 46 and the convex portion 48 may be changed. For example, the keyboard holder 31 may have a convex portion, and the housing may have a lock member including a claw portion.

Next, an exemplary second embodiment of the invention will be described with FIG. 10 hereinbelow.

The second embodiment discloses a configuration in which a user open area 13 of a housing 4 is detachably covered with a cover member 61. As the housing 4 and the user open area 13 are not changed from the first embodiment, the same reference numbers are also used in the second embodiment.

Figure 10:
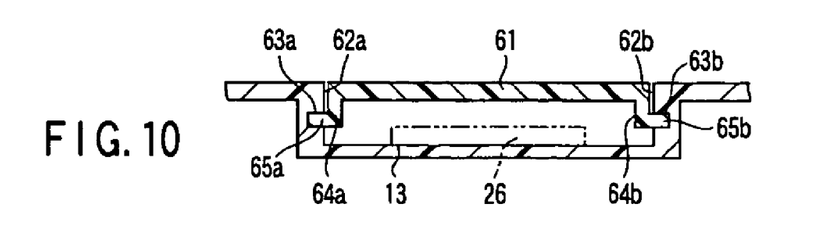
FIG. 10 is an exemplary sectional view showing an attaching structure of a keyboard holder attached to a housing in a second embodiment of the present invention.

As shown in FIG. 10, the user open area 13 of the housing 4 has a front edge 62a and a rear edge 62b. The front edge 62a and the rear edge 62b extend in the width direction of the housing 4 and are arranged in parallel to each other. Slit-like guide grooves 63a and 63b are formed in the front edge 62a and the rear edge 62b, respectively. The guide grooves 63a and 63b extend in the width direction of the housing 4, and are opened in one end being along the width direction of the housing 4.

The cover member 61 has a pair of walls 64a and 64b bent downward along the front edge 62a and the rear edge 62b. Flange-like guide portions 65a and 65b are formed on the outer surfaces of the walls 64a and 64b. The guide portions 65a and 65b are inserted into the guide grooves 63a and 63b from one end being along the width direction of the housing 4. In this manner, the cover member 61 is detachably held in the housing 4 to cover the user open area 13.

Figure 11:
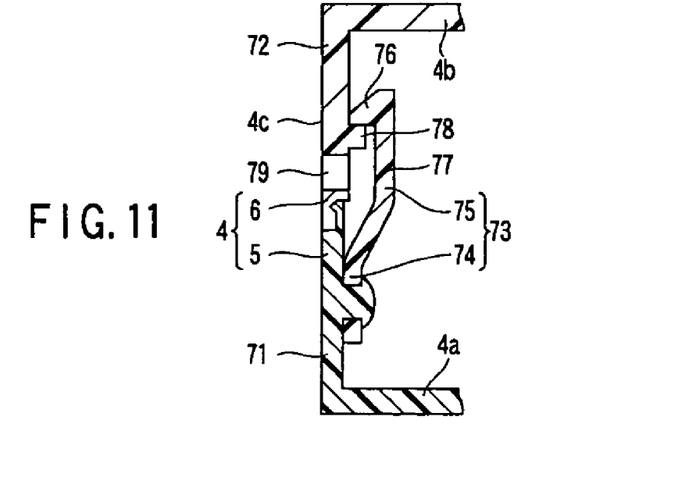
FIG. 11 is an exemplary sectional view showing a state a lower housing and an upper housing are connected to each other through a lock member in a third embodiment of the present invention.
Figure 12:
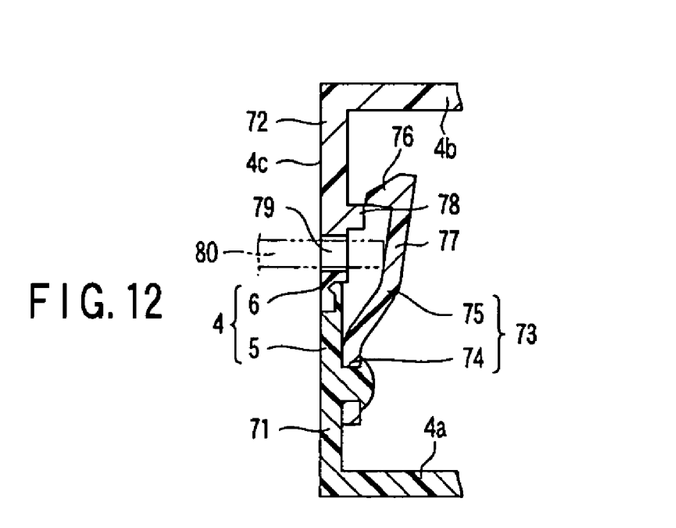
FIG. 12 is an exemplary sectional view showing a state in which a lock state of the upper housing set by the lock member is released in the third embodiment.

FIGS. 11 and 12 disclose an exemplary third embodiment of the invention.

The same reference numbers as in the first embodiment are put for the same structures and/or parts as those in the first embodiment. Herein, the structure of a part for connecting, e.g., a lower housing 5 and an upper housing 6 of a housing 4 is modified from the first embodiment.

As shown in FIGS. 11 and 12, the lower housing 5 serving as one example of a first member has a standing wall 71 extending upward from the side edge of a bottom wall 4a. Similarly, the upper housing 6 serving as an example of a second member has a standing wall 72 extending downward from the side edge of a top wall 4b. The upper edge of the standing wall 71 is detachably engaged with the lower edge of the standing wall 72, thereby connecting the lower housing 5 and the upper housing 6 to each other. These standing walls 71 and 72 constitute a side wall 4c of the housing.

Lock members 73 made of a synthetic resin are attached to the inner surface of the standing wall 71 of the lower housing 5. The lock members 73 are to maintain the connection state between the lower housing 5 and the upper housing 6, and are located at a plurality of positions along a peripheral direction of the housing 4. The lock members 73 are located inside the housing 4 and entirely covered with the housing 4.

Each of the lock members 73 has a fixed portion 74 and a movable portion 75. The fixed portion 74 is fixed to the inner surface of the standing wall 71 by means such as thermal caulking or the like. The movable portion 75 projects from the lower housing 5 to the upper housing 6. When the upper and lower housings 5 and 6 are connected to each other, the movable portion 75 faces the inner surface of the standing wall 72 of the upper housing 6.

The movable portion 75 has a claw portion 76 and a press portion 77. The claw portion 76 is elastically displaced between an engagement position where the claw portion 76 is engaged with a convex portion 78 projecting from the inner surface of the standing wall 72 and an disengagement position where the claw portion 76 is separated from the convex portion 78, but is urged to return the engagement position by the specific elastic force of the movable portion 75. As the convex portion 78 is a portion that engages with the claw portion 76, the convex portion 78 and the claw portion 76 constitute a locking mechanism for fixing the lower housing 5 to the upper housing 6.

When the upper housing 6 is covered on the lower housing 5 to engage the standing wall 72, the claw portion 76 of the lock member 73 is removably coupled (e.g., "hanged on") to the convex portion 78. In this way, the connection state between the lower housing 5 and the upper housing 6 is held and maintained.

The press portion 77 of the lock member 73 is located between the movable portion 75 and the claw portion 76, and may be displaced together with the claw portion 76. The press portion 77 faces the inner surface of the standing wall 72 of the upper housing 6. The standing wall 72 has a through hole 79 serving as an operation portion at a position corresponding to the press portion 77 of the lock member 73. The through hole 79 has a very small size such that the distal end of a thin rod-like member 80 (e.g., wire, tip of a writing instrument, etc.) can be inserted into the through hole 79. The through hole 79 faces the press portion 77. For this reason, a part of the press portion 77 is exposed to the outside of the housing 4 through the through hole 79.

In other words, the press portion 77 of the lock member 73 is covered with the housing 4 except for a very small region facing the through hole 79. Thus, although the press portion 77 is exposed to the outside of the housing 4, it is difficult to directly operate the press portion 77 with the fingertips of a hand. This structure allows a user to avoid to inadvertently unlock the keyboard holder 31.

A procedure of detaching the upper housing 6 from the lower housing 5 will be described below.

As shown in FIG. 12, the rod-like member 80 is inserted into the through hole 79 of the upper housing 6, the distal end of the rod-like member 80 presses the press portion 77 of the lock member 73 in such a direction that the press portion 77 is distanced from the standing wall 72. This pressing operation displaces the claw portion 76 to separate the claw portion 76 from the convex portion 78. This causes the claw portion 76 to move from the engagement position to the disengagement position. For this reason, the connection between the lower housing 5 and the upper housing 6 set by the lock member 73 is released, and the lower housing 5 and the upper housing 6 can be separated from each other.

According to the third embodiment of the present invention, the engagement between the claw portion 76 of the lock member 73 and the convex portion 78 of the upper housing 6 may be easily released from the outside of the housing 4. For this reason, an operation performed when the lower housing 5 and the upper housing 6 are separated from each other may be easily performed without any severe damage and/or deformation to the upper and lower housings 5 and 6.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic apparatus, comprising:
   a housing;
   a cover detachably supported on the housing;
   a lock mechanism which is covered with the cover and which locks the cover to the housing; and
   an operation portion which allows to access the lock mechanism from the outside of the housing and the cover, in order to unlock the cover from the housing,
   wherein the lock mechanism unlocks the cover from the housing when a part of the lock mechanism is pressed in a direction from the cover toward the lock mechanism through the operation portion.

2. An electronic apparatus according to claim 1, wherein the lock mechanism includes a claw arranged in the cover and a convex portion arranged in the housing, and the claw and the convex portion are engaged each other under the lock condition.

3. An electronic apparatus according to claim 2, wherein the claw is elastically displaced between an engagement position where the claw is engaged with the convex portion and an unlocked position where the claw is released from the convex portion.

4. An electronic apparatus according to claim 3, wherein the claws includes a press portion, and the operation portion has a hole formed in the cover in order to expose the press portion of claw to the outside of the cover and to allow the claw to displace to the unlocked position.

5. An electronic apparatus according to claim 3, wherein the cover is slidably between a first position and a second position with respect to the housing, and the claw is engaged with the convex portion when the cover is slid from the first position to the second position.

6. An electronic apparatus according to claim 1, wherein the housing includes a storing portion that detachably holds one of a plurality of functional units, and the cover detachably covers the storing portion.

7. An electronic apparatus, comprising:
   a housing having a keyboard support portion arranged on the upper surface thereof;
   a keyboard detachably mounted to the keyboard support portion;
   a cover detachably covering the upper surface of the housing and having a holding portion which holds a part of the keyboard with the keyboard support portion, the cover adapted to be positioned in either a first position or a second position with respect to the housing;
   a lock mechanism partially arranged on the cover and covered by the cover, the lock mechanism engaged with the housing to lock the cover on the housing; and
   an operation portion which allows to access the lock mechanism in order to unlock the cover from the housing from the outside of the housing and the cover,
   wherein the lock mechanism is engaged with the housing when the cover is slid from the first position to the second position and is unlocked when a part of the lock mechanism is pressed in a direction from the cover toward the lock mechanism through the operation portion.

8. An electronic apparatus according to claim 7, further comprising;
   a functional unit; and
   a storing portion formed in the housing and which holds the functional unit,
   wherein the cover covers the storing portion.

9. An electronic apparatus according to claim 8, wherein the keyboard support portion and the storing portion are located on the upper surface of the housing and next to each other.

10. An electronic apparatus according to claim 9, wherein the holding portion is located between the keyboard support portion and the storing portion.

11. An electronic apparatus according to claim 7, wherein the lock mechanism includes a claw arranged in the cover and a convex portion arranged in the housing, and the claw and the convex portion are engaged each other during locking.

12. An electronic apparatus according to claim 11, wherein the claw is elastically displaced between an engagement position where the claw is engaged with the convex portion and an unlocked position where the claw is released from the convex portion.

13. An electronic apparatus according to claim 12, wherein the claws includes a press portion, and the operation portion has a hole formed in the cover in order to expose the press portion of the claw to the outside of the cover and to allow the claw to displace to the unlocked position.

14. An electronic apparatus according to claim 13, wherein the housing has a plurality of engagement holes, and the cover has a plurality of engagement projections corresponding to the engagement holes so that the engagement projections are coupled to the engagement holes when the cover is slid from the first position to the second position, thereby holding the cover at a predetermined position with respect to the housing.

15. An electronic apparatus according to claim 7, wherein the lock mechanism is interposed between the cover and the housing.

16. An electronic apparatus according to claim 7, wherein the keyboard has a tongue portion that extends from an edge to the upper surface of the housing, and the cover holds the tongue portion with the housing.

17. An electronic apparatus according to claim 7, wherein the cover is detachably fixed to the housing at a position different from that of the lock mechanism through a screw.

18. An electronic apparatus, comprising:

a housing;

a cover detachably supported on the housing, the cover including a hole; and a lock mechanism attached to an inner surface of the cover, the lock mechanism locking the cover to the housing at an engagement position, the lock mechanism including a press portion at a position corresponding to the hole of the cover and being unlocked when the press portion is pressed in a direction from the cover toward the lock mechanism through the hole.

19. An electronic apparatus according to claim 18, wherein the lock mechanism includes a claw arranged in the cover and a convex portion arranged in the housing, the claw and the convex portion becoming engaged when the lock mechanism is placed in a lock condition.

20. An electronic apparatus according to claim 19, wherein the claw includes the press portion, and is elastically displaced between an engagement position where the claw is engaged with the convex portion and an unlocked position where the claw is released from the convex portion when the press portion is pressed.

* * * * *